United States Patent [19]

Mead

[11] 3,995,733

[45] * Dec. 7, 1976

[54] VIBRATORY PILE CONVEYOR SYSTEM

[75] Inventor: Dennis E. Mead, Cazenovia, N.Y.

[73] Assignee: Lipe-Rollway Corporation, Liverpool, N.Y.

[*] Notice: The portion of the term of this patent subsequent to Feb. 5, 1991, has been disclaimed.

[22] Filed: Dec. 7, 1972

[21] Appl. No.: 313,123

Related U.S. Application Data

[63] Continuation-in-part of Ser. No. 137,442, April 26, 1971, abandoned.

[52] U.S. Cl. ............................................. 198/766
[51] Int. Cl.$^2$ ........................................ B65G 27/00
[58] Field of Search ............. 198/220 BA, 220 CA; 46/1 C

[56] References Cited

UNITED STATES PATENTS

| | | | |
|---|---|---|---|
| 1,601,247 | 9/1926 | Garbarini | 46/1 C |
| 2,256,700 | 9/1941 | Armstrong | 198/220 BA |
| 3,667,590 | 6/1972 | Mead | 198/220 BA |
| 3,789,711 | 2/1974 | Mead | 198/220 BA |

FOREIGN PATENTS OR APPLICATIONS

| | | | |
|---|---|---|---|
| 78,294 | 10/1954 | Denmark | 46/1 C |
| 546,496 | 3/1932 | Germany | 198/220 BA |
| 29,098 | 11/1969 | Japan | 198/220 BA |
| 434,797 | 8/1935 | United Kingdom | 46/1 C |

Primary Examiner—Evon C. Blunk
Assistant Examiner—Jeffrey V. Nase
Attorney, Agent, or Firm—Beveridge, DeGrandi, Kline & Lunsford

[57] ABSTRACT

A trough-shaped element is vibrated in a motion that includes a rise and fall of the trough, and the inside of the trough is lined with a pile material of flexible filaments uniformly inclined from the vertical toward the direction of feed along the trough. The filaments have a size, density and resilience so the tips of the filaments flexibly support and feed objects along the trough.

1 Claim, 7 Drawing Figures

INVENTORS
DENNIS E. MEAD
SEYMOUR H. BART
BY Cumpston, Shaw
and Stephens
ATTORNEYS 4,995,733

VIBRATORY PILE CONVEYOR SYSTEM

RELATED APPLICATIONS

This application is a continuation-in-part of application Ser. No. 137,442 filed on Apr. 26, 1971 entitled CONVEYOR SYSTEM and abandoned upon the filing of this application.

THE INVENTIVE IMPROVEMENT

Vibratory conveyor troughs are generally known, and they are normally lined with an elastomeric or high coefficient of friction material. The invention involves recognition of the way that vibratory conveyor troughs can be greatly improved for faster feeding with greater feeding force over longer lengths requiring less vibrational power per unit of length. In accomplishing these improvements, the invention aims at simplicity, economy, quieter operation, object orientation, less marring of objects being fed, compatibility with highly liquid environments, and size adaptability.

SUMMARY OF THE INVENTION

The inventive conveyor trough has a trough-shaped element supported for vibratory motion and a vibrator for moving the trough in a motion that includes a rise and fall. The inside of the trough is lined with a pile material having flexible filaments uniformly inclined from the vertical toward the direction of feed along the trough, and the filaments have a size, density, and resilience so the tips of the filaments flexibly support and feed objects along the trough.

DRAWINGS

Figure 1:
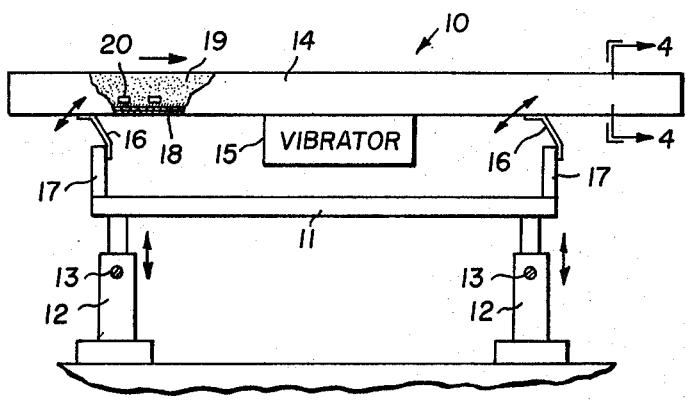
FIGS. 1 and 2 are partially schematic, partially cut-away, elevational views of two preferred embodiments of the inventive conveyor.
Figure 4:
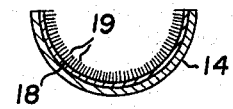
Figure 5:
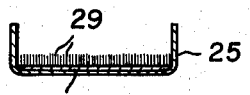
Figure 2:
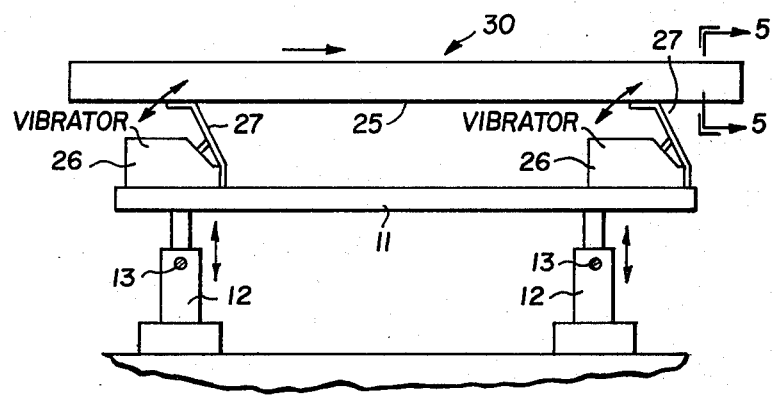
Figure 6:
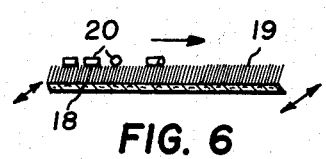
Figure 7:
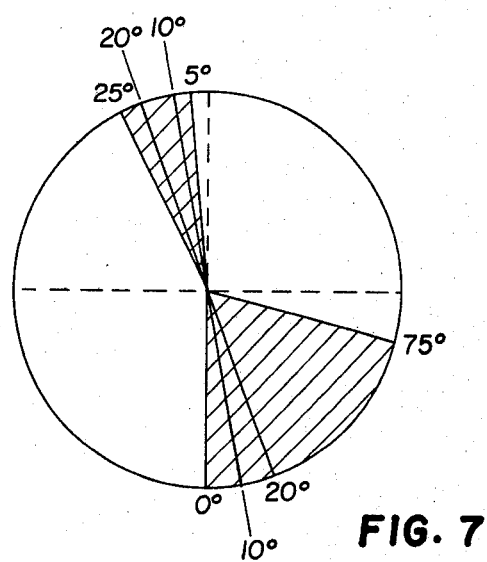

FIGS. 4 and 5 are fragmentary, cross-sectional views of the conveyors of FIGS. 1 and 2 respectively taken along the lines 4 — 4 and 5 — 5 thereof;

FIG. 6 is a fragmentary, schematic, elevational view of the preferred operating motion for the inventive conveyor; and FIG. 7 is a schematic diagram of preferred pile and vibration angles for the inventive conveyor.

DETAILED DESCRIPTION

The conveyor 10 of FIG. 1 has a base 11 supported by telescopically adjustable legs 12 having set screws 13 and used for setting the height and inclination of conveyor 10. A trough-shaped element 14 is mounted on base 11 for vibratory motion, and vibrator 15 is suspended from trough 14 for producing the desired vibration. Resilient strips 16 are secured to the bottom of trough 14 and to posts 17 on base 11 and the resilience of strips 16 allows their trough ends to vibrate in small arcs exaggerated by the arrows in FIG. 1. Strips 16 are preferably inclined from the vertical so that they extend downward from trough 14 toward the direction of feed which is to the right as illustrated in FIG. 1. The inclination of strips 16 from the vertical is preferably between 10° – 75°, and preferably about 15° – 25°, and strips 16 are preferably formed of a laminate of fiberglass and resin materials.

Several known vibrators 15 can drive trough 14 in a desired motion that includes a rise and fall under the control of flexible strips 16. Trough 14 preferably rises and moves to the right toward the feed direction in one half cycle of vibration and moves downward and away from the feed direction in the other half cycle of vibration; and orbital or reciprocal motions of vibrator 15 can accomplish such motion in conjunction with flexible strips 16. The vibratory motion for trough 14 can also be a vertical reciprocation or orbital motion including a rise and fall.

The inside of trough 14 is lined with a pile material 18 having filaments 19 that are flexible and uniformly inclined from the vertical toward the direction of feed to the right as shown in FIG. 1. The tips of filaments 19 preferably lie in a common, generally cylindrical surface inside trough 14, and filaments 19 have a size, density, and resilience so that their tips flexibly support and feed objects 20 along trough 14. the inclination of filaments 19 from the vertical is preferably between 5° – 25° toward the direction of feed, and preferably about 20° toward the direction of feed.

The operation of pile filaments 19 is best shown schematically in FIG. 6. Pile material 18 is vibrated in a motion that is reciprocal in a direction inclined above the horizontal as indicated by the arrows, so that pile material 18 rises and moves toward the feed direction of one half cycle of vibration and falls and moves away from the feed direction on the other half cycle of vibration. Objects 20 are flexibly supported on the tips of filaments 19, and as pile material moves upward, filaments 19 are flexed under the weight of objects 20 to bend downward and urge objects 20 toward the right to feed them along as shown by the arrow.

The preferred vibratory motion of trough 14 will move objects along the trough even if the trough is unlined, or lined with a solid material other than pile 18. However, pile material 18 greatly increases the speed and feeding force of objects 20 along trough 14, and it allows trough 14 to have a much greater length for the vibrational energy consumed. Pile material 18 is silent in its engagement with objects 20 to reduce objectionable factory noise from bouncing or clatter of objects 20 against a solid surface. Pile 18 also ensures that objects 20 are not marred in passing along trough 14.

Conveyor 30 of FIG. 2 is similar to conveyor 10 in having a base 11 and telescoping legs 12 held by set screws 13. However, trough 25 is supported and driven by a pair of vibrators 26 mounted on base 11 and connected to trough 25 by flexible resilient strips 27. Vibrators 26 are preferably moved in phase in a reciprocal motion inclined above the horizontal toward the direction of feed to the right as shown in FIG. 2. This moves the trough ends of resilient strips 27 in reciprocal paths similar to the movement of flexible strips 16 described above, so that trough 25 has the preferred motion of trough 14.

Trough 25 is lined with pile material 28 having filaments 29, and as shown in FIG. 5, the cross-sectional shape of trough 25 need not be simi-circular. Filaments 29 of pile 28 are similar to filaments 19 in size, density, resilience, and inclination.

Figure 3:
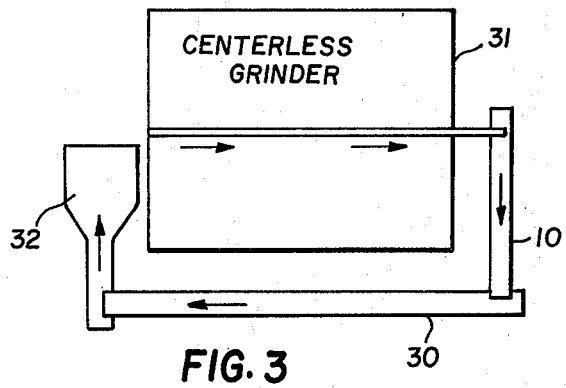
FIG. 3 is a partially schematic, plan view of the inventive conveyors used in association with a centerless grinder.

FIG. 3 shows schematically the use of conveyors 10 and 30 with a centerless grinder 31. Grinder 31 is chosen merely to illustrate one application of conveyors 10 and 30 because it imposes several difficult circumstances on any conveyor system. For example, grinder 31 is set up as a lapping machine to put a very fine finish on roller bearings which must pass twice through grinder 31. The roller bearings must be handled gently and not marred, or their fine finish will be spoiled. Also, grinder 31 uses a grinding coolant that splashes about making the environment of the grinder very wet. Also, the roller bearings are soaked with this coolant when they emerge from the grinder. Presently a worker collects rollers discharged from grinder 31 and moves them gently to staging basin 32 at the input end of grinder 31 for a second pass through the machine. However, the inventive conveyors 10 and 30 operate with the required speed and gentleness, and function well enough in the wet environment so that this worker can do something more important.

Rollers discharged from grinder 31 are dropped into one end of conveyor 10 which is vibrated to move the rollers in the direction of the arrow into conveyor 30. Conveyor 10 is preferably set at an incline by adjusting legs 12 so that liquid from grinder 31 and from the discharged rollers will collect at the bottom of pile material 18 and drain to one end of conveyor 10 for collection. The tips of pile filaments 19 gently and quickly move the rollers along conveyor 10 without being affected by such liquid. Conveyor 30 is also vibrated and oriented to drive rollers in the direction of the arrow for discharge into a chute leading to collection basin 32. Conveyor 30 is also preferably inclined by adjustment of legs 12 for draining off liquid.

In addition to the illustrated arrangements for conveyors 10 and 30, combinations of vibrators and resilient support strips can be used. For example, a single, base-mounted vibrator 26 can be used with a pair of support strips 16 if desired. Whenever two or more vibrators are used, they are operated in phase, and support strips and vibrators can be combined in many ways to support the length and weight of a particular trough.

Troughs 14 and 25 can have many cross-sectional shapes besides those illustrated, and can extend for any desired length. They are preferably vibrated as described and lined with inclined pile material for optimum feeding. Troughs 14 and 25 can be cut off at any desired length to fit into existing spaces, and they can be given a cross-sectional shape for orienting or maintaining the orientation of objects being fed.

Pile material 18 or 28 is preferably selected relative to objects 20 so that the filaments 19 or 29 have a size, density and resilience for flexibly supporting objects 20 on the tips of the filaments. This allows the filaments to flex slightly under the force applied to the trough for moving the objects quickly and forcefully in the direction of inclination of the pile. Filaments 19 and 29 are preferably formed as monofilaments of a synthetic resin material, and many filament shapes and sizes are available for the desired use.

Experience with the invention since the parent application was filed has led to improvements schematically shown in FIG. 7, showing a diagram of preferred angles of inclination for pile and vibration. The optimum pile filament angles lie between 5° and 25° from the vertical as illustrated with the preferred range for most applications falling between 10° and 20°. Generally the smaller angles produce greater speed at a sacrifice of feeding force, and the larger angles have a somewhat slower speed with greater force. Vibration angles are successful throughout a wider range as illustrated, from vertical to 75° from the vertical. The optimum vibration angle tends to align generally with the pile angle, particularly at angles closer to the vertical, but the vibration angle can incline further from the vertical and still be quite successful. The vibration angle should not be transverse to the pile angle and should stay in the same quadrant and in the diametrically opposite quadrant as the pile inclination.

With the proper pile angle and vibration angle within the suggested ranges, the filaments are flexed slightly on each vibrational upstroke, and their flexure moves objects in the feed direction for a forceful and rapid feed compared to vibration of a hard surface or a surface covered with a soft or matted-down pile.

The vibrators shown in FIG. 2 are illustrated schematically and would actually drive element 25 through rigid brackets connected to base 11 by resilient strips as is generally known. FIG. 2 schematically represents such an arrangement.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand how to apply the inventive conveyor troughs to many feed situations, and will understand how to adjust the variable parameters to different circumstances.

I claim:

1. In a conveyor system having a base and a generally horizontal element supported on said base by resilient strips and vibrated in a motion that includes a rise and fall of said element to feed objects along the length of said element, the improvement comprising:
   a. the feed surface of said element being covered with a pile material having flexible filaments uniformly inclined by about 5°–25° from the vertical toward said feed direction along the length of said element;
   b. said filaments having uniform length and thickness and a sufficient density so that only the tips of said filaments support said objects to be fed;
   c. means for vibrating said element in a generally reciprocal motion at a vibration angle aligned generally with the pile angle; and
   d. said filaments being sufficiently resilient to flex under said objects during upward movement of said element in said vibratory motion to increase the feeding speed and force of said element in moving said objects in said feed direction.

* * * * *